Valentine & Bradway,
Jointing Staves.

Nº 10,687.   Patented Mar. 28, 1854.

UNITED STATES PATENT OFFICE.

E. VALENTINE AND A. BRADWAY, OF MONSON, MASSACHUSETTS.

MACHINE FOR JOINTING STAVES.

Specification of Letters Patent No. 10,687, dated March 28, 1854.

*To all whom it may concern:*

Figure 4:
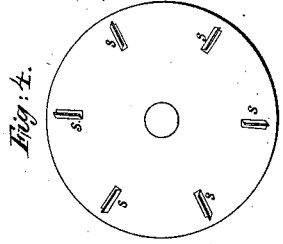
Figure 3:
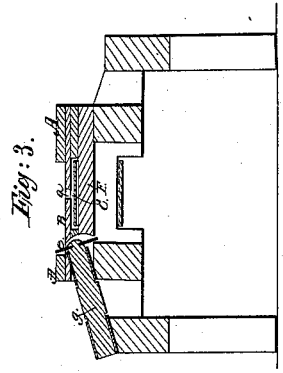
Figure 1:
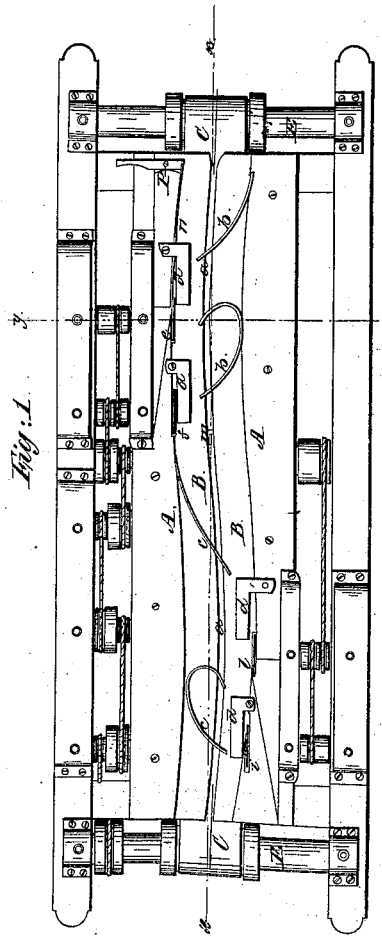
Figure 2:
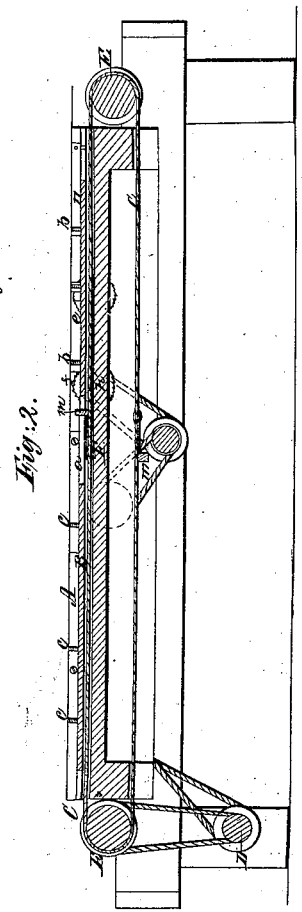
Figure 5:

Be it known that we, ELIJAH VALENTINE and ABEL BRADWAY, of Monson, in the county of Hampden and State of Massachusetts, have invented a new and Improved Machine for Jointing Staves; and we do hereby declare that the following is a full and exact description thereof, reference being had to the accompanying drawings, making part of this specification, Figure 1 being a plan of the machine; Fig. 2, a vertical section thereof, in the line $x$ $x$ of Fig. 1; Fig. 3, a vertical section in the line $y$ $y$ of Fig. 1; Fig. 4, view of a modification of a part detached, and Fig. 5 view of another portion detached.

Like letters designate corresponding parts in all the figures.

Immediately under a thin platform B, which extends lengthwise over the central portion of the frame of the machine, passes, in the direction shown by the arrows, an endless belt C, and runs around rollers E, E, at the ends of the machine. A channel $a$, is cut through said platform over the middle of the belt, in the form of a double curve, winding in opposite directions at the two ends, and with about the same degree of curvature as the ordinary curve to be given to the edges of the staves. Through this channel move spurs $m$, $m$, and are made to follow its windings by being attached to said endless belt by means of arms and joint-pins $t$, $t$, (Figs. 1, 2, and 5,); which, projecting above the platform, drive the staves forward, as they are placed thereon. On each side of said channel and at a distance therefrom less than the whole, but more than half the, width of any stave to be jointed, is secured a raised ledge A, of about the thickness of a stave, the borders on opposite sides thereof being nearly or exactly parallel with the channel and with each other, and alternately concave and convex, as shown in Fig. 1. The stave is first pressed against one concave border by springs $b$, $b$, in order to joint the side thereof thus brought in contact; and is thence driven over against the other concave border by springs $c$, $c$, for jointing its other side. It is also kept down upon the platform B, by springs $d$, $d$, &c., or other suitable means. In front of each concave border is situated a thin, uniformly flexible strip of metal $n$, one end of which is secured to the ledge, and the other end to an adjusting lever $p$. By straightening or bending said strip with its adjusting lever, its curvature, and consequently that of the stave, will be regularly varied, so that any degree of bilge may thereby be given to the cask. Only one of said strips is represented in the drawings; the other being arranged in a precisely similar manner. Near the middle of the first concave is situated a small circular saw $e$, (or other equivalent cutter,) whose arbor $g$, is inclined, (as shown in Fig. 3,) so as to give a suitable bevel to the stave to form the proper radial joint in the cask. A second, finer saw $f$, whose arbor $h$, has the same inclination as the arbor $g$, is situated in the concave a little behind the first saw $e$, and serves to smooth the edge first made by said saw $e$. Instead of a saw $f$, we contemplate using a Bramah wheel Fig. 4, whose cutters $s$, $s$, &c., smooth the edge of the staves.

As soon as the stave has passed the first concave and becomes jointed on one edge, it is pressed over against the other concave by the springs $c$, $c$, where its other edge is jointed by two similar saws, or a saw and Bramah wheel, $l$, and $i$, whose arbors $j$, and $k$, have the same inclination as those of the saws $e$, and $f$. All of said arbors may be made adjustable in inclination, so as to joint staves for all sizes of casks. When the second edge of the stave has been jointed, it is pushed along and discharged from the machine by the belt C, and another stave brought forward. The power is applied to a shaft D, (Fig. 2,) and thence communicated to the rollers E, E, and arbors $g$, $h$, $j$, $k$, by bands, as shown in the drawings.

What we claim as our invention and desire to secure by Letters Patent, is—

1. The combination of the alternate, reversely-curved ledges A, A, on opposite sides of the doubly-curved channel $a$, with the springs $b$, $b$, and $c$, $c$, placed opposite to their concave portions, for the purpose of directing the stave, alternately to the jointers arranged along said concave portions of the ledges, with a properly curved motion for jointing both edges of the staves to a suitable form, substantially as herein set forth.

2. We also claim the uniformly flexible, metallic strips $n$, $n$, at the sides of the recess B, just in front of the cutters, in combination with the adjusting lever $p$, for the purpose of enabling the curvature of the stave to be varied by tightening or slackening the said metallic strips, and thus varying the curved sides of the recess, substantially as herein set forth.

The above specification of our improved machine for jointing staves signed by us this twenty second day of March 1853.

ELIJAH VALENTINE.
   ABEL BRADWAY.

Witnesses:
 MERRILL BARLOW,
 CHAS. C. KNIGHT.